(12) United States Patent
Bonk et al.

(10) Patent No.: US 11,926,248 B2
(45) Date of Patent: Mar. 12, 2024

(54) VEHICLE AND OCCUPANT SUPPORT FOR A VEHICLE

(71) Applicant: Faurecia Automotive Seating, LLC, Auburn Hills, MI (US)

(72) Inventors: Jeffery T. Bonk, Chesterfield, MI (US); Robert C. Fitzpatrick, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 33 days.

(21) Appl. No.: 17/571,782

(22) Filed: Jan. 10, 2022

(65) Prior Publication Data

US 2023/0219470 A1 Jul. 13, 2023

(51) Int. Cl.
*B60N 2/30* (2006.01)
*B60R 7/04* (2006.01)
*B60N 3/00* (2006.01)

(52) U.S. Cl.
CPC ........... *B60N 2/309* (2013.01); *B60N 2/3015* (2013.01); *B60N 2/3065* (2013.01); *B60R 7/043* (2013.01); *B60N 3/002* (2013.01)

(58) Field of Classification Search
CPC .... B60N 2/3015; B60N 2/309; B60N 2/3011; B60N 2/2209; B60N 2/2245; B60N 2/3065; B60N 2/305; B60N 3/002; B60P 3/423; B60R 7/043; B60R 7/00; B60R 7/04; B60R 5/00; B60R 5/045; B60R 2011/024
USPC ............ 296/65.09, 65.01, 65.05, 37.15, 37.8
See application file for complete search history.

(56) References Cited

U.S. PATENT DOCUMENTS

| 1,894,103 | A | * | 1/1933 | Kuenzel | B60N 2/36 297/63 |
|---|---|---|---|---|---|
| 4,106,809 | A | * | 8/1978 | Minka | B60N 2/3015 297/63 |
| 5,951,104 | A | * | 9/1999 | Tsuchiya | B60N 2/06 296/65.09 |
| 6,786,535 | B1 | * | 9/2004 | Grzegorzewski | B60N 2/3013 296/37.16 |
| 8,322,770 | B2 | * | 12/2012 | Kosuge | B60N 2/305 296/183.1 |
| 8,573,670 | B2 | | 11/2013 | Zekavica | |
| 8,690,217 | B2 | * | 4/2014 | Yamamoto | B62D 47/003 296/65.09 |
| 8,985,665 | B2 | | 3/2015 | Aschaber | |
| 10,618,444 | B2 | | 4/2020 | Kish | |

(Continued)

FOREIGN PATENT DOCUMENTS

| DE | 2147697 A1 * | 3/1973 | ........... B60N 2/3015 |
|---|---|---|---|
| DE | 19628699 A1 * | 1/1998 | ........... B60N 2/3011 |

(Continued)

OTHER PUBLICATIONS

Jagus et al. DE 10339407 B3, machine translation, ip.com, Sep. 30, 2004 (Year: 2004).*

*Primary Examiner* — Amy R Weisberg
*Assistant Examiner* — Wenwei Zhuo
(74) *Attorney, Agent, or Firm* — Barnes & Thornburg LLP

(57) ABSTRACT

An occupant support for a vehicle includes a seat bottom arranged to overlie a floor of the vehicle, a seat back coupled to the seat bottom and arranged to extend upwardly away from the floor. The occupant support further includes a seat mode-change system that allows the occupant support to adjust the seat bottom and the seat back to provide a storage space.

18 Claims, 2 Drawing Sheets

(56) References Cited

U.S. PATENT DOCUMENTS

Figure 1:
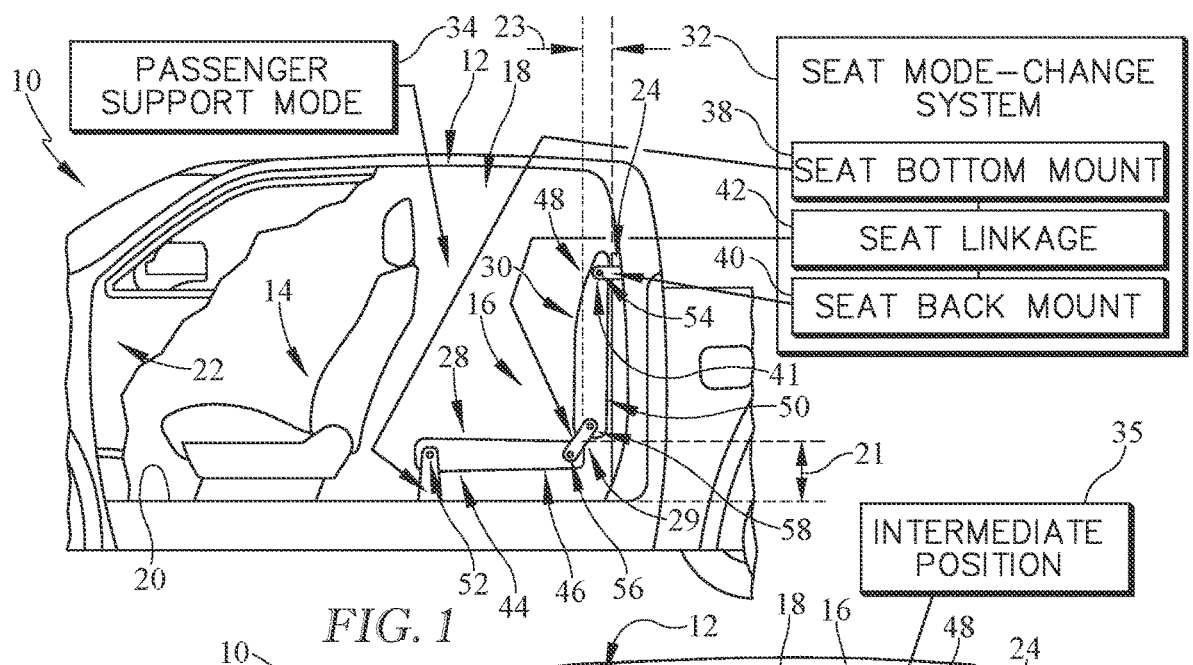

| | | | |
|---|---|---|---|
| 2003/0127880 A1* | 7/2003 | Nonaka | B60N 2/3056 296/63 |
| 2004/0130175 A1* | 7/2004 | Mack | B60N 2/3015 296/65.09 |
| 2017/0225751 A1* | 8/2017 | Fuller, IV | B63B 29/04 |
| 2018/0105078 A1 | 4/2018 | Murray | |
| 2022/0001990 A1* | 1/2022 | Heimbach | B60N 2/01 |
| 2023/0092189 A1* | 3/2023 | Lim | B60N 2/3015 |

FOREIGN PATENT DOCUMENTS

| | | | | |
|---|---|---|---|---|
| DE | 10339407 | B3 * | 9/2004 | B60N 2/3011 |
| DE | 10357126 | A1 * | 7/2005 | B60N 2/3015 |
| DE | 102005017772 | A1 | 1/2006 | |
| DE | 102011118422 | A1 * | 5/2013 | B60N 2/3015 |
| DE | 102019130446 | A1 * | 5/2021 | B60N 2/3015 |
| EP | 0736411 | A2 * | 10/1996 | B60N 2/3015 |
| EP | 0736412 | A1 * | 10/1996 | B60N 2/3015 |
| EP | 1571035 | A1 * | 9/2005 | B60N 2/3015 |
| EP | 1964721 | A1 * | 9/2008 | B60R 5/045 |
| FR | 1586887 | A * | 3/1970 | B60N 2/3015 |
| FR | 2838689 | A1 * | 10/2003 | B60N 2/3015 |
| FR | 2911307 | A3 * | 7/2008 | B60N 2/3015 |
| FR | 2919235 | A1 * | 1/2009 | B60N 2/3015 |
| FR | 2950581 | A1 * | 4/2011 | B60R 5/045 |
| FR | 2961759 | A1 * | 12/2011 | B60N 2/30 |
| FR | 2980415 | A1 * | 3/2013 | B60N 2/3031 |
| FR | 2985230 | A1 * | 7/2013 | B60N 2/3015 |
| GB | 706874 | A * | 4/1954 | B60N 2/3015 |
| GB | 2356132 | A * | 5/2001 | B60N 2/3015 |
| JP | S6144038 | A * | 3/1986 | B60N 2/30 |

* cited by examiner

VEHICLE AND OCCUPANT SUPPORT FOR A VEHICLE

BACKGROUND

The present disclosure relates to occupant supports, and particularly to rear occupant supports. More particularly, the present disclosure relates to a rear occupant support that is reconfigurable.

SUMMARY

According to the present disclosure, a vehicle includes a vehicle frame, a front occupant support, and a rear occupant support. The vehicle frame defines a passenger compartment and includes a floor and a rear wall. The rear occupant support is reconfigurable relative to the rest of the vehicle to provide one or more storage spaces within the passenger compartment. The rear occupant support includes a seat bottom and a seat back. The seat bottom is normally arranged generally horizontal to the floor, and the seat back extends upwardly away from the floor to provide a seating surface for an occupant in a normal, passenger-support mode of the rear occupant support.

In illustrative embodiments, the rear occupant support further includes a seat mode-change system configured to allow movement of the rear occupant support relative to the floor and the rear wall between the passenger support mode and a storage mode. In the storage mode, the rear occupant support defines a storage space that is divided from the rest of the passenger compartment by portions of the rear occupant support to block objects stored in the storage space from moving out of the storage space and under the forward occupant support, for example.

In illustrative embodiments, the seat mode-change system includes a seat bottom mount, a seat back mount, and a seat linkage. The seat bottom mount is coupled to the floor and a forward end of the seat bottom. The seat back mount is coupled to the rear wall and an upper end of the seat back. The seat linkage interconnects a rear end of the seat bottom and a lower end of the seat back.

In illustrative embodiments, the seat linkage allows the seat bottom and the seat back to move relative to one another as the rear occupant support changes from the passenger support mode, to one or more intermediate position(s) between the passenger support mode and the storage mode, and to the storage mode. In the intermediate position, the forward end of the seat bottom rotates about a first seat-bottom pivot axis such that the rear end of the seat bottom is lifted upwardly away from the floor and moved horizontally toward the front occupant support. The seat linkage rotates about both a second seat-bottom pivot axis and a second seat-back pivot axis such that a portion of the seat back overlies a surface of the seat bottom in the intermediate position to allow the rear occupant support to change to the storage mode. Meanwhile, the upper end of the seat back rotates about a first seat-back axis such that the lower end of the seat back moves upwardly away from the floor and forward towards the front occupant support.

In illustrative embodiments, the storage mode is configured to provide a storage space located rearward of the seat bottom and below the seat back. In the storage mode, the storage space is defined horizontally between the seat bottom and the rear wall and vertically between the seat back and the floor. The seat bottom is oriented generally vertical relative to the floor, while the seat back is oriented generally horizontal relative to the floor to provide the storage space.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
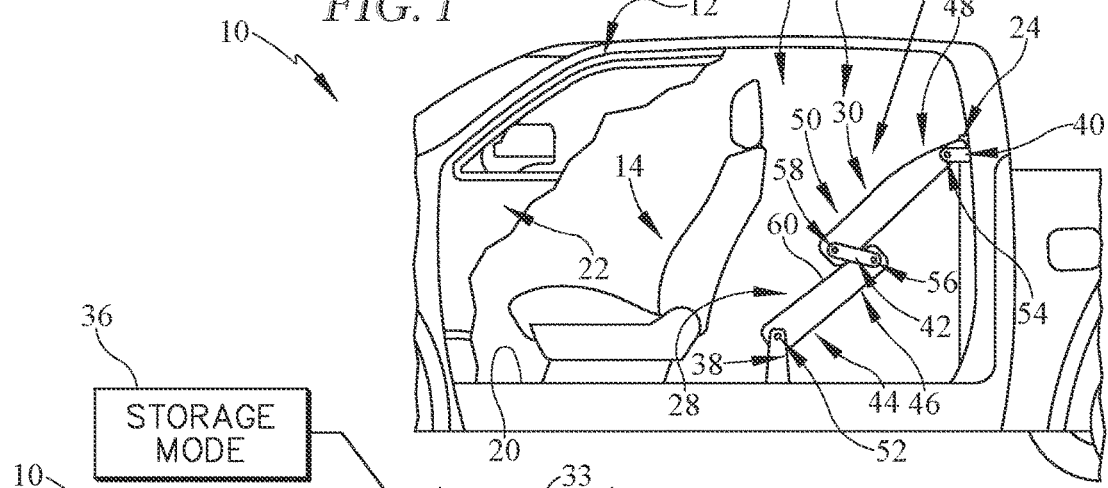
Figure 3:
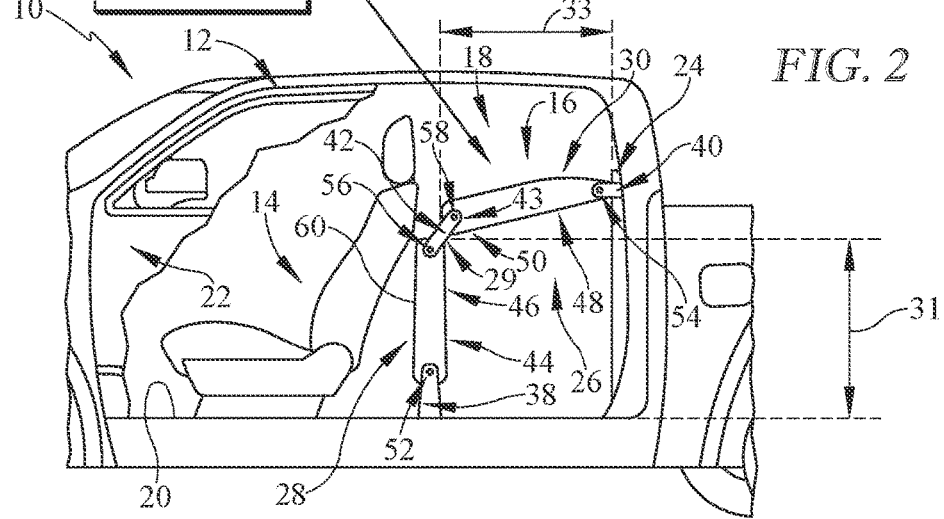
Figure 4:
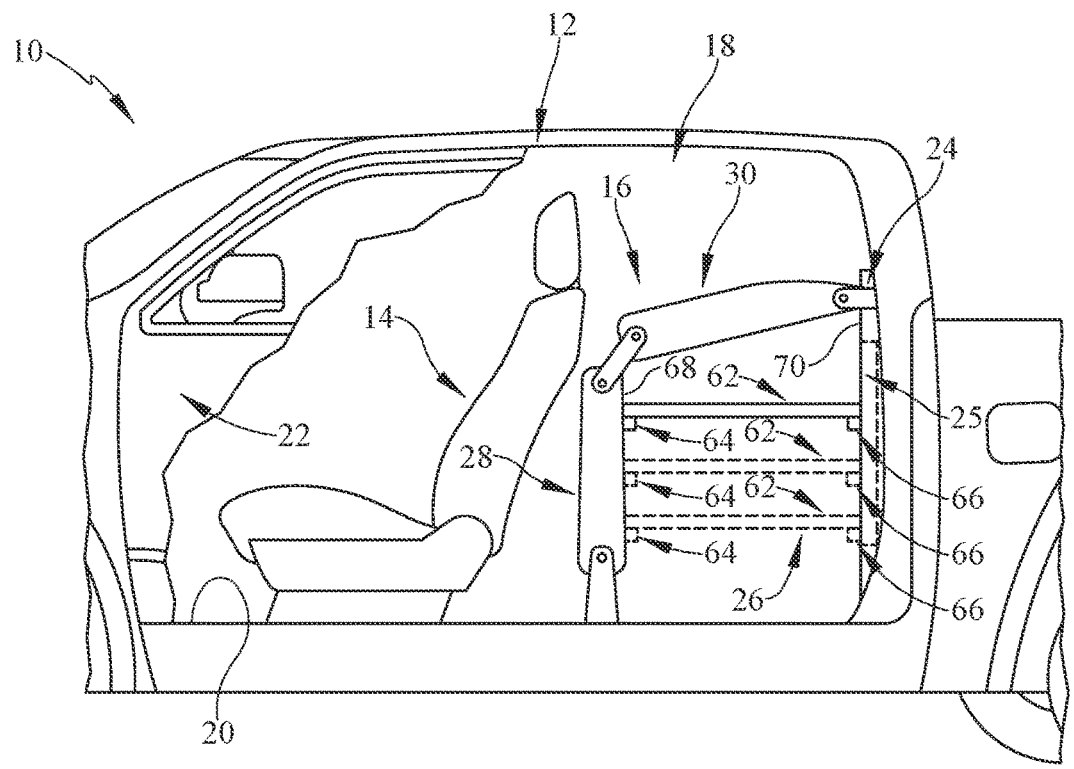
Figure 5:
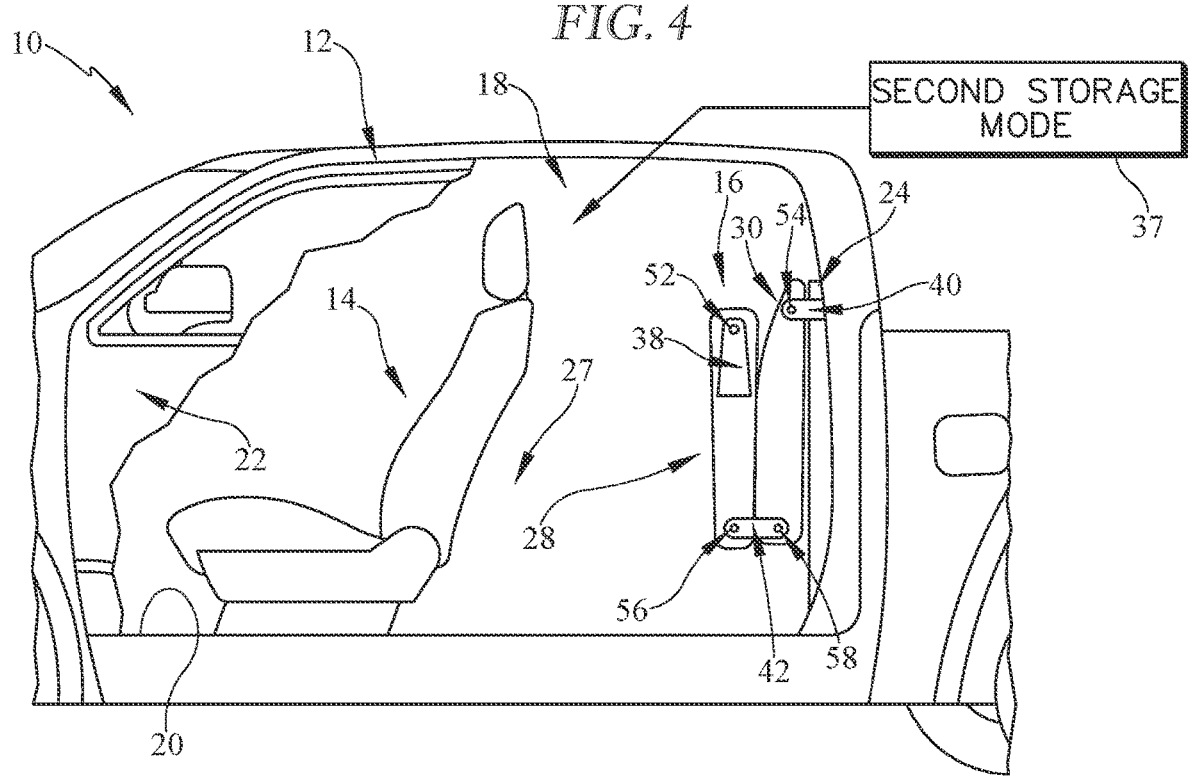

The detailed description particularly refers to the accompanying figures in which:

FIG. 1 is a side elevation and diagrammatic view of a portion of a vehicle with portions cut away to show that the vehicle includes a vehicle frame, a front occupant support, and a rear occupant support including a seat bottom and a seat back that cooperate to provide a seating space for an occupant when the rear occupant support is in a passenger support mode, and showing that the rear occupant support further includes a seat mode-change system that is configured to allow the rear occupant support to change from the passenger support mode to a storage mode, as shown in FIG. 3;

FIG. 2 is a side elevation and diagrammatic view of a portion of the vehicle shown in FIG. 1 showing the rear occupant support in an intermediate position between the passenger support mode and the storage mode and showing that the seat mode-change system includes a seat bottom mount coupled between a floor of the vehicle and the seat bottom for pivotable movement about a first seat-bottom pivot axis, a seat back mount coupled between a rear wall of the vehicle and the seat back for pivotable movement about a first seat-back axis, and a seat linkage coupled to and interconnecting a rear end of the seat bottom and a lower end of the seat back to allow movement of the rear occupant support to the intermediate position;

FIG. 3 is a side elevation and diagrammatic view of a portion of the vehicle of FIG. 1 showing the rear occupant support in the storage mode in which the seat back is arranged in a generally horizontal orientation relative to the floor and the seat bottom is arranged in a generally vertical orientation relative to the floor to define a storage space located rearward of the seat bottom and below the seat back;

FIG. 4 is a side elevation and diagrammatic view of a portion of the vehicle of FIG. 3 showing the rear occupant support in the storage mode and showing that the rear occupant support further includes a storage shelf coupled between the seat bottom and the rear wall, and suggesting that the storage shelf is repositionable along a first plurality of vertically-spaced shelf supports arranged along a rearward-facing surface of the seat bottom and a second plurality of vertically-spaced shelf supports arranged along a forward-facing surface of the rear wall; and FIG. 5 is a side elevation and diagrammatic view of a portion of the vehicle of FIG. 1 showing the seat bottom mount detached from the floor and arranged generally vertically relative to the floor in confronting relation to the seat back to provide a forward storage space between the seat bottom and the front occupant support.

DETAILED DESCRIPTION

A vehicle 10 in accordance with the present disclosure includes a vehicle frame 12, a front occupant support 14, and a rear occupant support 16, as shown in FIG. 1. The vehicle frame 12 defines a passenger compartment 18 and includes a floor 20, a front dash 22 providing a front boundary of the passenger compartment 18, and a rear wall 24 providing a rear boundary of the passenger compartment 18. The front occupant support 14 is configured to support an occupant of the vehicle 10, for example, and is positioned directly aft of the front dash 22. The rear occupant support 16 is also configured to support an occupant of the vehicle 10 and may be located directly forward of the rear wall 24 to lie between the front occupant support 14 and the rear wall 24.

The rear occupant support 16 is reconfigurable relative to the rest of the vehicle 10 to provide a storage space 26 within the passenger compartment 18 of the vehicle 10 as shown in FIG. 3. The rear occupant support 16 includes a seat bottom 28, a seat back 30, and a seat mode-change system 32. The seat bottom 28 extends generally horizontally relative to and above the floor 20. The seat back 30 is coupled to the seat bottom 28 and is arranged to extend upwardly away from the floor 20 in front of the rear wall 24. The seat mode-change system 32 is configured to couple the rear occupant support 16 to the floor 20 and the rear wall 24 and allows the seat bottom 28 and the seat back 30 to move relative to the rest of the vehicle 10 to provide the storage space 26 in the passenger compartment 18. In some embodiments, the front occupant support 14 is a first or second row occupant support and the rear occupant support is a second or third row occupant support.

The seat mode-change system 32 is also configured to allow movement of the rear occupant support 16 relative to the floor 20 and the rear wall 24 between a passenger support mode 34, shown in FIG. 1, and a storage mode 36, shown in FIG. 3. The passenger support mode 34 is configured to support an occupant of the vehicle 10, for example. The storage mode 36 is configured to provide the storage space 26 located rearward of the seat bottom 28 and below the seat back 30. In the storage mode 36, the storage space 26 is defined horizontally between the seat bottom 28 and rear wall 24 and vertically between the seat back 30 and the floor 20.

The seat mode-change system 32 includes a seat bottom mount 38, a seat back mount 40, and a seat linkage 42 as shown in FIG. 1. The seat bottom mount 38 is coupled to the floor 20 and a forward end 44 of the seat bottom 28. The seat back mount 40 is coupled to the rear wall 24 and an upper end 48 of the seat back 30. The seat linkage 42 interconnects a rear end 46 of the seat bottom 28 and a lower end 50 of the seat back 30. In some embodiments, the seat bottom mount 28 and the seat back mount 40 are fixed in place relative to the floor 20 and the rear wall 24, respectively. The seat linkage 42 allows the seat bottom 28 and the seat back 30 to move relative to one another as the rear occupant support 16 changes from the passenger support mode 34, to an intermediate position(s) 35 between the passenger support mode 34 and the storage mode 36 as shown in FIG. 2, and to the storage mode 36. The seat bottom 28 and the seat back 30 cooperate to define a seat bite line 29 between a rear end 46 of the seat bottom 28 and a lower end 50 of the seat back. In the passenger support mode 34, the seat bite line 29 is spaced from the floor 20 a first distance 21 and from the rear wall 24 a second distance 23 as shown in FIG. 1. In the storage mode 36, the seat bite line 29 is spaced from the floor 20 a third distance 31, greater than the first distance 21, and from the rear wall 24 a fourth distance 33, greater than the second distance 23 as shown in FIG. 3.

The seat bottom mount 38 provides a first seat-bottom pivot axis 52 as shown in FIGS. 1-3. The forward end 44 of the seat bottom 28 is mounted to the seat bottom mount 38 for pivotable movement of the seat bottom 28 about the first seat-bottom pivot axis 52. The first seat-bottom pivot axis 52 allows the seat bottom 28 to be oriented generally horizontal relative to the floor 20 in the passenger support mode 34, shown in FIG. 1, and generally vertical relative to the floor 20 in the storage mode 36, shown in FIG. 3. The first seat-bottom pivot axis 52 is fixed relative to the floor 20. In some embodiments the seat bottom mount 38 may be detachable from the floor 20 to provide a different storage mode as shown in FIG. 5.

The seat back mount 40 provides a first seat-back pivot axis 52 as shown in FIGS. 1-3. The upper end 48 of the seat back 30 is mounted to the seat back mount 40 for pivotable movement of the seat back 30 about the first seat-back pivot axis 54. The first seat-back pivot axis 54 allows the seat back 28 to be oriented generally vertical relative to the floor 20 in the passenger support mode 34, shown in FIG. 1, and generally horizontal relative to the floor 20 in the storage mode 36, shown in FIG. 3. The seat back mount 40 is fixed relative to the rear wall 24. In alternative embodiments, the seat back mount 40 may be detachable from the rear wall 24 or the seat back 30 may be detachable from the seat back mount 40 to move away from the rear wall 24.

The seat linkage 42 is coupled to the rear end 46 of the seat bottom 28 to provide a second seat-bottom pivot axis 56 and to the lower end 50 of the seat back 30 to provide a second seat-back pivot axis 58 as shown in FIGS. 1-3. The pivot axes 56, 58 are spaced apart from one another and are located on opposite ends of the seat linkage 42. In other embodiments, the pivot axes 56, 58 may be spaced closer to each other along the seat linkage 42. The seat linkage 42 allows the seat bottom 28 and the seat back 30 to translate relative to one another as the rear occupant support 16 transitions from the passenger support mode to the storage mode.

The intermediate positon 35 occurs when the rear occupant support 16 is between the passenger support mode 34 and the storage mode 36 as suggested in FIG. 2. The forward end 44 of the seat bottom 28 rotates about the first seat-bottom pivot axis 52 in a first direction such that the rear end 46 of the seat bottom 28 is lifted upwardly away from the floor 20 and moved horizontally toward the front occupant support 14. The linkage 42 rotates about both the second seat-bottom pivot axis 56 and the second seat-back axis 50 as the seat bottom 28 is lifted. These rotations allow the lower end 50 of the seat back 30 to move such that a portion of the seat back 30 partially overlies an upper surface 60 of the seat bottom 28 in the intermediate position. Meanwhile, the upper end 48 of the seat back 30 rotates about the first seat-back pivot axis 54 in a second direction opposite the first direction such that the lower end 50 of the seat back 30 moves upwardly away from the floor 20 and forward toward the front occupant support 14. In some embodiments, a user manually pushes the seat bottom 28 up and forward. In other embodiments, the seat bottom 28 is pushed up and forward by an electric motor in response to user inputs. Alternatively, the seat back 30 may be pulled forward to trigger the rotation of the seat bottom 28 and the seat back 30 about axes 52, 54.

The rear occupant support 16 may further include a support-mode lock 41 as shown in FIG. 1 and a storage-mode lock 43 as shown in FIG. 3. The support-mode lock 41 is coupled to the rear wall 24 to selectively block movement of the rear occupant support 16 from the passenger support mode 34 toward the storage mode 36. The storage-mode lock 43 is coupled between the seat back 30 and the seat back mount 40 to selectively block movement of the rear occupant support 16 from the storage mode 36 to the passenger support mode. In some embodiments, the support-mode lock 41 may be coupled between the seat bottom 28 and the seat bottom mount 38. The storage-mode lock 43 may be coupled between the seat bottom 28 and the seat linkage 42 or between the seat back 28 and the seat linkage 42. In other embodiments, the support-mode lock 41 and the storage-mode lock 43 may be the same lock that engages portions of the rear occupant support 16 in the passenger support mode and the storage mode. In one example, the locks 41, 43 include first component, such as a latch, and a second component, such as a bar, that engages the first component to selectively block movement of the second component.

In other embodiments, the support-mode lock 41 may be two or more support-mode locks 41 coupled to the floor 20 and/or rear wall 24, and/or the storage-mode lock 43 may be two or more storage-mode locks 43 coupled to the seat bottom 28 and/or the seat back 30. In some embodiments, the support-mode lock 41 and the storage-mode lock 43 may be operated manually by a user, or, in other embodiments, the locks 41, 43 may be operated by an electric motor in response to user inputs.

In some embodiments, the rear occupant support 16 may also include a storage shelf 62 coupled between the seat bottom 28 and the rear wall 24 when the rear occupant support 16 is in the storage mode 36 as shown in FIG. 4. The storage shelf 62 is configured to provide multiple sub-spaces of the storage space 26. When not in use, the storage shelf 62 may be stored in a designated compartment 25 in the rear wall 24, under the front occupant support 14, under the rear occupant support 16, or elsewhere in the vehicle 10. The storage shelf 62 may be moved manually to a use position between the seat bottom 28 and the rear wall 24 by a user. In other embodiments, the storage shelf 62 may be coupled to and pivotable from the rear wall 24.

The storage shelf 62 may be supported above the floor 20 by a first shelf support 64 and a second shelf support 66 as shown in FIG. 4. The first shelf support 64 is fixed to a rearward-facing surface 68 of the seat bottom 28. The second shelf support 66 is fixed to a forward-facing surface 70 of the rear wall 24. The first and second shelf supports 64, 66 are aligned vertically to each other such that, when the storage shelf 62 is positioned between the seat bottom 28 and the rear wall 24, the storage shelf 62 is substantially level and/or parallel to the floor 20. In some embodiments, the first and second shelf supports 64, 66 may be removable from the rearward-facing surface 68 and the forward-facing surface 70 when the storage shelf 62 is not in use. In other embodiments, the first and second shelf supports 50, 52 may be repositionable along the rearward-facing surface 56 and the forward-facing surface 58 to adjust a vertical height 54 of the storage shelf 48 relative to the floor 20. In some embodiments, the first shelf support 50 and the second shelf support 52 is a ledge or notch formed into the seat bottom 28 and the rear wall 24, respectively.

In some embodiments, the seat bottom 28 includes a first plurality of vertically-spaced shelf supports 64 and the rear wall includes a second plurality of vertically-spaced shelf supports 66 as shown in FIG. 4. While FIG. 4 shows each plurality of vertically-spaced shelf supports 64, 66 having three vertically-spaced shelf supports, in other embodiments, each plurality of vertically-spaced shelf supports 64, 66 may include two vertically spaced shelf supports, or more than three vertically-spaced shelf supports. In other embodiments, more than one storage shelf 62 may be placed on the first and second plurality of vertically-spaced shelf supports 64, 66 to increase the number of sub-spaces within the storage space 26.

The seat bottom mount 38 may be detachable from the floor 20 to move the rear occupant support 16 to a second storage mode 37 as shown in FIG. 5. In the second storage mode 37, the seat bottom 28 is oriented vertically and in confronting relation to the seat back 28 to provide a forward storage space 27. To move the rear occupant support 16 from the passenger support mode 34 to the second storage mode 37, the seat bottom mount 38 may be detached from the floor 20. The seat bottom 28 is then rotated about the second seat-bottom pivot axis 56 to arrange the seat bottom 28 in confronting relation to the seat back 30. In other embodiments, the seat bottom 28 may be detached from the seat bottom mount 38 and rotated about the second seat-bottom pivot axis 56 to the second storage mode 37.

The following numbered clauses include embodiments that are contemplated and non-limiting:

Clause 1. A vehicle includes a vehicle frame including a floor, a front dash, and a rear wall to define a passenger compartment between the front dash and the rear wall and above the floor.

Clause 2. The vehicle of clause 1, any other clause, or any suitable combination of clauses, further includes a front occupant support positioned directly aft of the front dash within the passenger compartment.

Clause 3. The vehicle of clause 2, any other clause, or any suitable combination of clauses, further includes a rear occupant support positioned directly forward of the rear wall and between the front occupant support and the rear wall within the passenger compartment, the rear occupant support including a seat bottom arranged to overlie the floor, a seat back coupled to the seat bottom and arranged to extend upwardly away from the floor in front of the rear wall, and a seat mode-change system configured to couple the rear occupant support to at least one of the floor and the rear wall, the seat mode-change system including a seat bottom mount coupled between the floor of the vehicle and the seat bottom, a seat back mount coupled between the rear wall of the vehicle and the seat back, and a seat linkage coupled to and interconnecting a rear end of the seat bottom and a lower end of the seat back of the rear occupant support, Clause 4. The vehicle of clause 3, any other clause, or any suitable combination of clauses, further includes wherein the seat mode-change system is configured to allow movement of the rear occupant support relative to the floor and the rear wall between a passenger support mode, in which the seat back is arranged in a generally vertical orientation relative to the floor and the seat bottom is arranged in a generally horizontal orientation relative to the floor to provide a seating space for an occupant above the seat bottom and forward of the seat back in the passenger support mode, and a storage mode, in which the seat back is arranged in a generally horizontal orientation relative to the floor and the seat bottom is arranged in a generally vertical orientation relative to the floor to define a storage space located rearward of the seat bottom and below the seat back in the storage mode.

Clause 5. The vehicle of clause 4, any other clause, or any suitable combination of clauses, wherein an upper end of the seat back is mounted to the seat back mount for pivotable movement about a first seat-back pivot axis between the generally vertical orientation in the passenger support mode and the generally horizontal orientation in the storage mode.

Clause 6. The vehicle of clause 5, any other clause, or any suitable combination of clauses, wherein a forward end of the seat bottom is mounted to the seat bottom mount for pivotable movement about a first seat-bottom pivot axis between the generally horizontal orientation in the passenger support mode and the generally vertical orientation in the storage mode.

Clause 7. The vehicle of clause 6, any other clause, or any suitable combination of clauses, wherein the seat linkage is mounted to the seat back for pivotable movement relative to the seat bottom and the seat back about a second seat-back pivot axis, and the seat linkage is mounted to the seat bottom for pivotable movement relative to the seat bottom and seat back about a second seat-bottom pivot axis that is spaced apart from the second seat-back pivot axis.

Clause 8. The vehicle of clause 7, any other clause, or any suitable combination of clauses, wherein the second seat-back pivot axis is located at a first end of the seat linkage and the second seat-bottom pivot axis is located at an opposite, second end of the seat linkage.

Clause 9. The vehicle seat of clause 5, any other clause, or any suitable combination of clauses, wherein the first seat-back pivot axis remains fixed relative to the rear wall as the rear occupant support changes from the passenger support mode to the storage mode.

Clause 10. The vehicle seat of clause 9, any other clause, or any suitable combination of clauses, wherein a forward end of the seat bottom is mounted to the seat bottom mount for pivotable movement about a first seat-bottom pivot axis between the generally horizontal orientation in the passenger support mode and the generally vertical orientation in the storage mode, and wherein the first seat-bottom pivot axis remains fixed relative to the floor as the rear occupant support changes from the passenger support mode to the storage mode.

Clause 11. The vehicle of clause 4, any other clause, or any suitable combination of clauses, wherein the seat bottom and the seat back cooperate to define a seat bite line between the lower end of the seat back and the rear end of the seat bottom and, in the passenger support mode, the seat bite line is spaced from the floor a first distance and from the rear wall a second distance, and, in the storage mode, the seat bite line is spaced from the floor a third distance, greater than the first distance, and is spaced from the rear wall a fourth distance greater than the second distance.

Clause 12. The vehicle of clause 4, any other clause, or any suitable combination of clauses, wherein the rear occupant support further includes a storage-mode lock coupled to at least one of the seat bottom and the seat back and configured to selectively block movement of the rear occupant support from the storage mode toward the passenger support mode.

Clause 13. The vehicle of clause 12, any other clause, or any suitable combination of clauses, wherein the rear occupant support further includes a support-mode lock coupled to at least one of the rear wall and the floor and configured to selectively block movement of the rear occupant support from the passenger support mode toward the storage mode.

Clause 14. A rear row occupant support for a vehicle, the rear occupant support includes a seat bottom arranged to overlie a floor of the vehicle.

Clause 15. The occupant support of clause 14, any other clause, or any suitable combination of clauses, further includes a seat back coupled to the seat bottom and arranged to extend upwardly away from the floor.

Clause 16. The occupant support of clause 15, any other clause, or any suitable combination of clauses, further includes a seat mode-change system configured to couple the rear occupant support to at least one of the floor and a wall of the vehicle, the seat mode-change system including a seat bottom mount, a seat back mount, and a seat linkage coupled to and interconnecting a rear end of the seat bottom and a lower end of the seat back, Clause 17. The occupant support of clause 16, any other clause, or any suitable combination of clauses, wherein the seat mode-change system is configured to allow movement of the rear occupant support relative to the floor and the wall between a passenger support mode, in which the seat back is arranged in a generally vertical orientation relative to the floor and the seat bottom is arranged in a generally horizontal orientation relative to the floor to provide a seating space for an occupant above the seat bottom and forward of the seat back, and a storage mode, in which the seat back is arranged in a generally horizontal orientation relative to the floor and the seat bottom is arranged in a generally vertical orientation relative to the floor to define a storage space located rearward of the seat bottom and below the seat back in the storage mode.

Clause 18. The occupant support of clause 17, any other clause, or any suitable combination of clauses, wherein an upper end of the seat back is mounted to the seat back mount for pivotable movement about a first seat-back pivot axis between the generally vertical orientation in the passenger support mode and the generally horizontal orientation in the storage mode.

Clause 19. The occupant support of clause 18, any other clause, or any suitable combination of clauses, wherein a forward end of the seat bottom is mounted to the seat bottom mount for pivotable movement about a first seat-bottom pivot axis between the generally horizontal orientation in the passenger support mode and the generally vertical orientation in the storage mode.

Clause 20. The occupant support of clause 19, any other clause, or any suitable combination of clauses, wherein the seat linkage is mounted to the seat back for pivotable movement relative to the seat bottom and the seat back about a second seat-back pivot axis, and the seat linkage is mounted to the seat bottom for pivotable movement relative to the seat bottom and seat back about a second seat-bottom pivot axis that is spaced apart from the second seat-back pivot axis.

Clause 21. The occupant support of clause 20, any other clause, or any suitable combination of clauses, wherein the second seat-back pivot axis is located at a first end of the seat linkage and the second seat-bottom pivot axis is located at an opposite, second end of the seat linkage.

Clause 22. The occupant support seat of clause 18, any other clause, or any suitable combination of clauses, wherein the first seat-back pivot axis remains fixed relative to the wall as the rear occupant support changes from the passenger support mode to the storage mode.

Clause 23. The occupant support seat of clause 22, any other clause, or any suitable combination of clauses, wherein a forward end of the seat bottom is mounted to the seat bottom mount for pivotable movement about a first seat-bottom pivot axis between the generally horizontal orientation in the passenger support mode and the generally vertical orientation in the storage mode, and wherein the first seat-bottom pivot axis remains fixed relative to the floor as the rear occupant support changes from the passenger support mode to the storage mode.

Clause 24. The occupant support of clause 17, any other clause, or any suitable combination of clauses, wherein the seat bottom and the seat back cooperate to define a seat bite line between the lower end of the seat back and the rear end of the seat bottom and, in the passenger support mode, the seat bite line is spaced from the floor a first distance and from the wall a second distance, and, in the storage mode, the seat bite line is spaced from the floor a third distance, greater than the first distance, and is spaced from the wall a fourth distance greater than the second distance.

Clause 25. The occupant support of clause 17, any other clause, or any suitable combination of clauses, wherein the rear occupant support further includes a storage-mode lock coupled to at least one of the seat bottom and the seat back and configured to selectively block movement of the rear occupant support from the storage mode toward the passenger support mode.

Clause 26. The occupant support of clause 19, any other clause, or any suitable combination of clauses, wherein the rear occupant support further includes a support-mode lock coupled to at least one of the wall and the floor and configured to selectively block movement of the rear occupant support from the passenger support mode toward the storage mode.

The invention claimed is:

1. A vehicle comprising
a vehicle frame including a floor, a front dash, and a rear wall to define a passenger compartment between the front dash and the rear wall and above the floor,
a front occupant support positioned directly aft of the front dash within the passenger compartment, and
a rear occupant support positioned directly forward of the rear wall and between the front occupant support and the rear wall within the passenger compartment, the rear occupant support including a seat bottom arranged to overlie the floor, a seat back coupled to the seat bottom and arranged to extend upwardly away from the floor in front of the rear wall, and a seat mode-change system configured to couple the rear occupant support to at least one of the floor and the rear wall, the seat mode-change system including a seat bottom mount coupled between the floor of the vehicle and the seat bottom, a seat back mount coupled between the rear wall of the vehicle and the seat back, and a seat linkage coupled to and interconnecting a rear end of the seat bottom and a lower end of the seat back of the rear occupant support,
wherein the seat mode-change system is configured to allow movement of the rear occupant support relative to the floor and the rear wall between a passenger support mode, in which the seat back is arranged in a generally vertical orientation relative to the floor and the seat bottom is arranged in a generally horizontal orientation relative to the floor to provide a seating space for an occupant above the seat bottom and forward of the seat back in the passenger support mode, a first storage mode, in which the seat back is arranged in a generally horizontal orientation relative to the floor and the seat bottom is arranged in a generally vertical orientation relative to the floor to define a storage space located rearward of the seat bottom and below the seat back in the storage mode, and a second storage mode, in which the seat bottom is oriented to extend vertically with the seat back and is positioned in confronting relation to the seat back to provide a forward storage space between the front row occupant support and the rear row occupant support,
wherein the rear wall is formed to include a compartment and the vehicle further comprises a storage shelf stored in the compartment when the rear row occupant support is in the passenger support mode, and wherein the storage shelf is supported above the floor by the seat bottom and the rear wall when the rear row occupant support is in the first storage mode to define a plurality of sub-spaces within the storage space.

2. The vehicle of claim 1, wherein an upper end of the seat back is mounted to the seat back mount for pivotable movement about a first seat-back pivot axis between the generally vertical orientation in the passenger support mode and the generally horizontal orientation in the first storage mode.

3. The vehicle of claim 2, wherein a forward end of the seat bottom is mounted to the seat bottom mount for pivotable movement about a first seat-bottom pivot axis between the generally horizontal orientation in the passenger support mode and the generally vertical orientation in the first storage mode.

4. The vehicle of claim 3, wherein the seat linkage is mounted to the seat back for pivotable movement relative to the seat bottom and the seat back about a second seat-back pivot axis, and the seat linkage is mounted to the seat bottom for pivotable movement relative to the seat bottom and seat back about a second seat-bottom pivot axis that is spaced apart from the second seat-back pivot axis.

5. The vehicle seat of claim 2, wherein the first seat-back pivot axis remains fixed relative to the rear wall as the rear occupant support changes from the passenger support mode to the first storage mode and the second storage mode.

6. The vehicle seat of claim 1, wherein a forward end of the seat bottom is mounted to the seat bottom mount for pivotable movement about a first seat-bottom pivot axis between the generally horizontal orientation in the passenger support mode and the generally vertical orientation in the first storage mode, and wherein the first seat-bottom pivot axis remains fixed relative to the floor as the rear occupant support changes from the passenger support mode to the first storage mode.

7. The vehicle of claim 1, wherein the rear occupant support further includes a storage-mode lock coupled to at least one of the seat bottom and the seat back and configured to selectively block movement of the rear occupant support from the first storage mode toward the passenger support mode.

8. The vehicle of claim 7, wherein the rear occupant support further includes a support-mode lock coupled to at least one of the rear wall and the floor and configured to selectively block movement of the rear occupant support from the passenger support mode toward the first storage mode.

9. A rear row occupant support for a vehicle, the rear occupant support comprising
a seat bottom arranged to overlie a floor of the vehicle,
a seat back coupled to the seat bottom and arranged to extend upwardly away from the floor,
a seat mode-change system configured to couple the rear occupant support to at least one of the floor and a wall of the vehicle, the seat mode-change system including a seat bottom mount, a seat back mount, and a seat linkage coupled to and interconnecting a rear end of the seat bottom and a lower end of the seat back,
wherein the seat mode-change system is configured to allow movement of the rear occupant support relative to the floor and the wall between a passenger support mode, in which the seat back is arranged in a generally vertical orientation relative to the floor and the seat bottom is arranged in a generally horizontal orientation relative to the floor to provide a seating space for an occupant above the seat bottom and forward of the seat back, a first storage mode, in which the seat back is arranged in a generally horizontal orientation relative to the floor and the seat bottom is arranged in a generally vertical orientation relative to the floor to define a storage space located rearward of the seat bottom and below the seat back in the storage mode, and a second storage mode, in which the seat bottom is oriented to extend vertically and is positioned in confronting relation to the seat back to provide a forward storage space in front of the rear row occupant support, and a storage shelf configured to be supported above the floor of the vehicle by the seat bottom and the wall of the vehicle when the rear row occupant support is in the first storage mode.

10. The occupant support of claim 9, wherein an upper end of the seat back is mounted to the seat back mount for pivotable movement about a first seat-back pivot axis between the generally vertical orientation in the passenger support mode and the generally horizontal orientation in the first storage mode.

11. The occupant support of claim 10, wherein a forward end of the seat bottom is mounted to the seat bottom mount for pivotable movement about the first seat-bottom pivot axis between the generally horizontal orientation in the passenger support mode and the generally vertical orientation in the first storage mode.

12. The occupant support of claim 11, wherein the seat linkage is mounted to the seat back for pivotable movement relative to the seat bottom and the seat back about a second seat-back pivot axis, and the seat linkage is mounted to the seat bottom for pivotable movement relative to the seat bottom and seat back about the second seat-bottom pivot axis that is spaced apart from the second seat-back pivot axis.

13. The occupant support of claim 12, wherein the second seat-back pivot axis is located at a first end of the seat linkage and the second seat-bottom pivot axis is located at an opposite, second end of the seat linkage.

14. The occupant support seat of claim 10, wherein the first seat-back pivot axis remains fixed relative to the wall as the rear occupant support changes from the passenger support mode to the first storage mode and the second storage mode.

15. The occupant support seat of claim 14, wherein a forward end of the seat bottom is mounted to the seat bottom mount for pivotable movement about the first seat-bottom pivot axis between the generally horizontal orientation in the passenger support mode and the generally vertical orientation in the first storage mode, and wherein the first seat-bottom pivot axis remains fixed relative to the floor as the rear occupant support changes from the passenger support mode to the first storage mode.

16. The occupant support of claim 9, wherein the seat bottom and the seat back cooperate to define a seat bite line between the lower end of the seat back and the rear end of the seat bottom and, in the passenger support mode, the seat bite line is spaced from the floor a first distance and from the wall a second distance, and, in the first storage mode, the seat bite line is spaced from the floor a third distance, greater than the first distance, and is spaced from the wall a fourth distance greater than the second distance.

17. The occupant support of claim 9, wherein the rear occupant support further includes a storage-mode lock coupled to at least one of the seat bottom and the seat back and configured to selectively block movement of the rear occupant support from the first storage mode toward the passenger support mode.

18. The occupant support of claim 17, wherein the rear occupant support further includes a support-mode lock coupled to at least one of the wall and the floor and configured to selectively block movement of the rear occupant support from the passenger support mode toward the first storage mode.

* * * * *